United States Patent [19]

Homme, Jr.

[11] 4,088,742
[45] May 9, 1978

[54] CONTACT SULFURIC ACID PROCESS EMPLOYING DOUBLE CONVERSION/DOUBLE ABSORPTION

[75] Inventor: Arthur C. Homme, Jr., Basking Ridge, N.J.

[73] Assignee: Allied Chemical Corporation, Morristown, N.J.

[21] Appl. No.: 772,191

[22] Filed: Feb. 25, 1977

[51] Int. Cl.$^2$ .................... C01B 17/72; C01B 17/68
[52] U.S. Cl. .................................. 423/522; 423/533
[58] Field of Search .................... 423/522, 533–535

[56] References Cited

U.S. PATENT DOCUMENTS

| 3,350,169 | 10/1967 | Rinckhoff | 423/522 |
| 3,443,896 | 5/1969 | Furkert et al. | 423/533 |
| 3,525,586 | 8/1970 | Dreclsel et al. | 423/522 |
| 3,653,828 | 4/1972 | Conner et al. | 423/522 |

FOREIGN PATENT DOCUMENTS

| 1,467,010 | 12/1968 | Germany | 423/522 |
| 1,567,403 | 5/1972 | Germany | 423/522 |
| 1,177,117 | 9/1964 | Germany | 423/522 |
| 956,049 | 4/1964 | United Kingdom | 423/535 |

OTHER PUBLICATIONS

Tucker et al., SO$_2$ Emission Control from Acid Plants, Chemical Engineering Progress, vol. 67, #5, May 1971, pp. 57–63.

Primary Examiner—O. R. Vertiz
Assistant Examiner—Gary P. Straub
Attorney, Agent, or Firm—Gerhard H. Fuchs; Ernest A. Polin

[57] ABSTRACT

Improvement in the contact sulfuric acid process employing double conversion, double absorption using a cold, sulfur dioxide-containing feed gas stream obtained from a wet gas purification plant, which involves bypassing a portion of the cold feed gas stream around the primary conversion and intermediate absorption sections, and introducing it directly into the secondary conversion section, results in energy savings by reducing amount of power required to transport the gas through the plant, and by increasing the amount of recoverable heat of reaction from the secondary conversion section.

8 Claims, 3 Drawing Figures

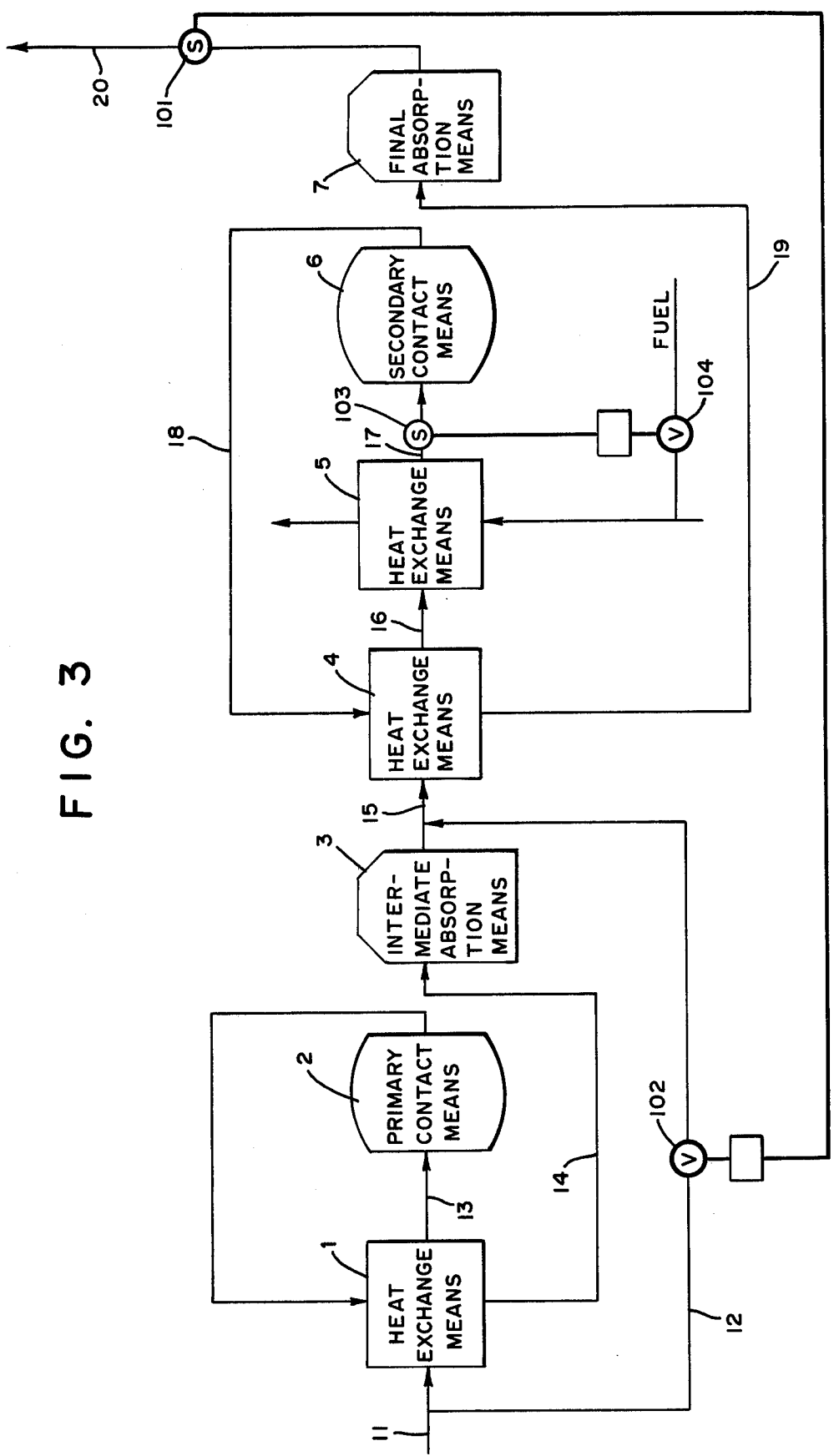

CONTACT SULFURIC ACID PROCESS EMPLOYING DOUBLE CONVERSION/DOUBLE ABSORPTION

BACKGROUND OF THE INVENTION

The present invention relates to an improvement in the contact sulfuric acid process. More particularly, the present invention relates to an improvement in the contact sulfuric acid process employing the double conversion-double absorption steps operating on cold sulfur dioxide-containing feed gas obtained from a wet gas purification plant.

In the contact sulfuric acid process, a gas stream containing both sulfur dioxide and free oxygen is passed through a catalyst, after having been preheated to the kindling temperature of the catalyst, if necessary, to effect oxidation of the sulfur dioxide to form sulfur trioxide, followed by cooling the gas stream to temperature within the range of about 400° to about 550° F and contacting it with strong sulfuric acid to effect selective absorption of the sulfur trioxide. The oxidation of sulfur dioxide to sulfur trioxide is an equilibrium reaction; complete oxidation of the sulfur dioxide cannot be achieved in the presence of the sulfur trioxide which is being formed. However, the equilibrium can be shifted toward the sulfur trioxide by removing the sulfur trioxide from the reaction mixture. Therefore, it is common practice to subject the gas stream from which sulfur trioxide has been selectively removed by scrubbing with strong sulfuric acid to a second conversion by passing it through a catalyst mass, after preheating it to the kindling temperature of the catalyst. Thereafter it is again cooled and passed through a second absorber wherein it is contacted with strong sulfuric acid to scrub sulfur trioxide therefrom. The exit gas from the second absorber, which now contains only trace amounts of unconverted sulfur dioxide, is vented to the atmosphere.

As previously noted, the feed gas stream containing both sulfur dioxide and free oxygen must, before introduction into the catalyst mass, be heated to at least the kindling temperature of the catalyst which, in the case of the commonly employed vanadium catalyst, is in the order of about 780° to about 800° F. In a sulfuric acid plant wherein the sulfur dioxide-containing feed gas stream is obtained by combustion of brimstone, this presents no problem since the gases obtained by combustion of brimstone are at a temperature above that kindling temperature, and excess heat can be recovered from the gas stream, as by passing it through a waste heat boiler prior to introducing it into the converter containing the catalyst. Also, the oxidation of sulfur dioxide to sulfur trioxide is an exothermic reaction, so that heat is generated in the conversion, which can be recovered, if desired.

In a sulfuric acid plant employing the double conversion-double absorption process steps, as above described, the gases obtained from the intermediate absorber must be preheated prior to introducing them into the second conversion stage. This can be effected under utilization of the heat generated in the second conversion stage, as shown by Furkert et al. in U.S. Pat. No. 3,443,896. However, since the temperature differentials involved here are relatively small, impracticably large heat exchangers of the shell-and-tube type would be required, and even then the heat available from reaction in the secondary stage is generally insufficient to make the process self-sustaining. For that reason, Furkert et al. suggested addition of pure, dry sulfur in the form of solid granules or in liquid form to the gas stream prior to its introduction into the secondary conversion stage, so that the sulfur melts and is ignited immediately and very quickly delivers the required heat in order to maintain the oxidation in the second conversion stage. Furkert et al.'s suggestion, while operable, presents certain equipment problems in that it requires special means for introducing the elemental sulfur. Furthermore, elemental sulfur may not be available at the plant, for example, when the plant is operating on sulfur dioxide-containing gas obtained by roasting of sulfur ores.

Disadvantages of use of shell-and-tube type heat exchangers for preheating the feed gas stream to the secondary conversion stage are overcome by employing heat sink type heat exchangers, as described by Mareski et al. Canadian Pat. No. 975,927. The higher heat recovery possible with less expensive and less corrosion susceptible pebble bed type heat exchangers as described by Mareski et al. may indeed avoid need for burning sulfur in the gas stream, as required by Furkert et al., in the event the gas stream being fed to the secondary conversion stage contains at least about one percent of sulfur dioxide. Nevertheless, the pebble bed heat exchangers required by Mareski et al. are bulky, and at least two of these are required. These are alternately heated and cooled by alternating the direction of the gases flowing through them, so that they require relatively close operator attention.

It has also been proposed to employ shell-and-tube type heat exchangers for preheating the feed gas stream to the secondary conversion stage to effect indirect heat exchange contact with exit gases from that stage, as described by Furkert et al., and to supply the additional amount of heat which may be required to bring the feed gas stream to the kindling temperature of the catalyst by indirectly contacting it with products of combustion of fossil fuel, as, for example, described by W. G. Toka and J. R. Burley in Chemical Engineering Practice, Vol. 67, No. 5, p. 57 et seq. (May 1971).

Of course, in a contact sulfuric acid plant operating on a hot sulfur dioxide-containing feed gas stream obtained by combustion of brimstone, sufficient heat is available to preheat the gases prior to introduction into the secondary conversion stage by indirect heat exchange with the hot gas from the brimstone combustion, or by indirect heat exchange contact with converter gases from the first conversion stage, or alternatively, by introducing hot sulfur dioxide-containing gases from the brimstone burner directly into the secondary conversion stage, as described by P. Rinckhoff, in U.S. Pat. No. 3,350,169. The Rinckhoff procedure of introducing hot products of combustion of brimstone directly into the secondary conversion stage seems to be equivalent to Furkert et al.'s procedure of introducing sulfur into that gas stream. In each case, the desired effect is provision of heat by combustion of sulfur. However, the expedient of Rinckhoff et al. is not available in a contact sulfuric acid plant employing a cold sulfur dioxide-containing feed gas stream obtained from a wet gas purification plant.

It is an object of the present invention to provide a double conversion-double absorption contact sulfuric acid process, using cold sulfur dioxide-containing feed gas obtained from a wet gas purification plant, having reduced energy requirements.

It is a further object to provide such process wherein size of equipment required for the primary conversion and intermediate absorption steps is reduced, wherein power requirements to transport the gas stream through the primary conversion and intermediate absorption steps are reduced, and wherein external heat requirements for preheating the feed gas stream to the secondary conversion step are minimized.

SUMMARY OF THE INVENTION

The present invention provides a process for making sulfuric acid by catalytic oxidation of sulfur dioxide from a cold sulfur dioxide-containing feed gas stream from a wet gas purification plant, involving the steps of:
  (a) dividing said cold feed gas stream into a first and a second stream, said second stream comprising from about 1 to about 30 percent by volume of the total gas stream;
  (b) preheating the first gas stream to the kindling temperature of the catalyst;
  (c) passing the preheated first gas stream through a primary contact section containing catalyst to effect oxidation of part of the sulfur dioxide to sulfur trioxide;
  (d) cooling the gas stream from the primary contact section to temperature between about 400° and about 500° F;
  (e) contacting the gas stream so cooled with sulfuric acid in an intermediate absorption section to effect absorption of sulfur trioxide therefrom;
  (f) combining the gas stream from the intermediate absorption section with said second gas stream obtained in step a), above, and preheating the combined gas stream to the kindling temperature of the catalyst by indirect heat exchange with hot gases from step g), below, augmented by indirect heat exchange with an external heat source, if necessary;
  (g) passing the preheated combined gas stream through a secondary contact section containing catalyst to effect oxidation of sulfur dioxide contained therein to sulfur trioxide;
  (h) cooling the gas stream from the secondary contact section to temperature between about 300° and about 420° F by indirect heat exchange with the gas stream to be introduced into the secondary contact section; followed by
  (i) contacting the cooled gas stream with sulfuric acid to effect absorption of sulfur trioxide therefrom.

In another aspect, the present invention provides an improvement in the contact sulfuric acid process employing the double conversion-double absorption procedure using a cold sulfur dioxide-containing feed gas stream from a wet gas purification plant, involving preheating the gas stream to the kindling temperature of the catalyst and passing it through a primary contact section containing catalyst to effect oxidation of sulfur dioxide to sulfur trioxide; cooling the gas stream and contacting it with sulfuric acid in an intermediate absorption section to effect absorption of sulfur trioxide therefrom; preheating the gas stream from the intermediate absorption section by indirect heat exchange contact with the exit gas stream from the secondary absorption section, if desired, and augmented by indirect heat exchange with an external heat source, if necessary; followed by passing the preheated gas stream through a secondary contact section containing catalyst to effect oxidation of sulfur dioxide contained therein to sulfur trioxide; cooling the gas stream and contacting it with sulfuric acid to effect absorption of sulfur trioxide therefrom, wherein the improvement comprises: dividing the cold sulfur dioxide-containing feed gas stream into a first and a second stream, said second stream comprising from about 1 to about 30 percent by volume of the total gas stream, and by-passing said second gas stream around the primary contact and intermediate absorption sections, and combining it with the gas stream from the intermediate absorption section prior to its introduction into the secondary contact section.

The procedure of the present invention has at least three advantages. First, it affords substantial savings in energy required for operation of the process by reducing the amount of energy necessary to transport the gas stream through the apparatus, in that that amount of energy which would otherwise be required for transporting the by-passed portion of the sulfur dioxide-containing gas stream through the primary contact and intermediate absorption stages is dispensed with. Second, since less gas is passed through the primary conversion and intermediate absorption sections, smaller sized equipment will suffice for these sections, resulting in important savings in cost of equipment and required amount of catalyst. Third, by virtue of introduction of sulfur dioxide-containing gas of higher sulfur dioxide content directly into the secondary contact section, the total amount of heat generated in that section by the oxidation of sulfur dioxide to sulfur trioxide is increased, and the additional heat becomes available for preheating the gas stream from the intermediate absorption section, thereby reducing the amount of heat which must be supplied by an external heat source, such as by a combustion of fossil fuel. There is a slight penalty in that the amount of sulfur dioxide in the gas stream vented to the atmosphere following the final absorption step is slightly increased. This increase, however, is minor and can be controlled within desired limits by controlling the amount of sulfur dioxide-containing gas stream which is by-passed around the primary conversion and intermediate absorption sections.

In addition, the improved process of the present invention permits facile and precise control of the amount of free sulfur dioxide contained in the exit gas stream at or below a desired fixed level. This may be readily accomplished by continually or intermittently monitoring the sulfur dioxide content of the exit gas, as by means of a sensor, and then automatically controlling the amount of sulfur dioxide-containing feed gas which is by-passed around the primary contact and intermediate absorption sections by means of a control valve, which may be automatically controlled responsive to sensor reading. Since variations in degree of by-pass will result in variations in the amount of heat generated within the secondary contact section, the amount of heat applied from an external heat source is then preferably controlled by sensing the temperature of the gas stream entering the secondary contact section and varying the amount of fuel supplied for preheating responsive to sensed temperature changes, as by an automatic control valve.

BRIEF DESCRIPTION OF THE DRAWINGS

The present invention is further illustrated by the annexed drawings, wherein

FIG. 3 is a schematic flow diagram of the essential processing steps and equipment employed therefor as in FIG. 1, but further illustrating means for sensing sulfur dioxide content in the exit gas stream and for controlling the degree of cold gas by-pass responsive thereto, as well as further optional means which may be employed in conjunction therewith for controlling the amount of heat applied by an external heat source to the gas stream entering the secondary conversion section.

Figure 1:
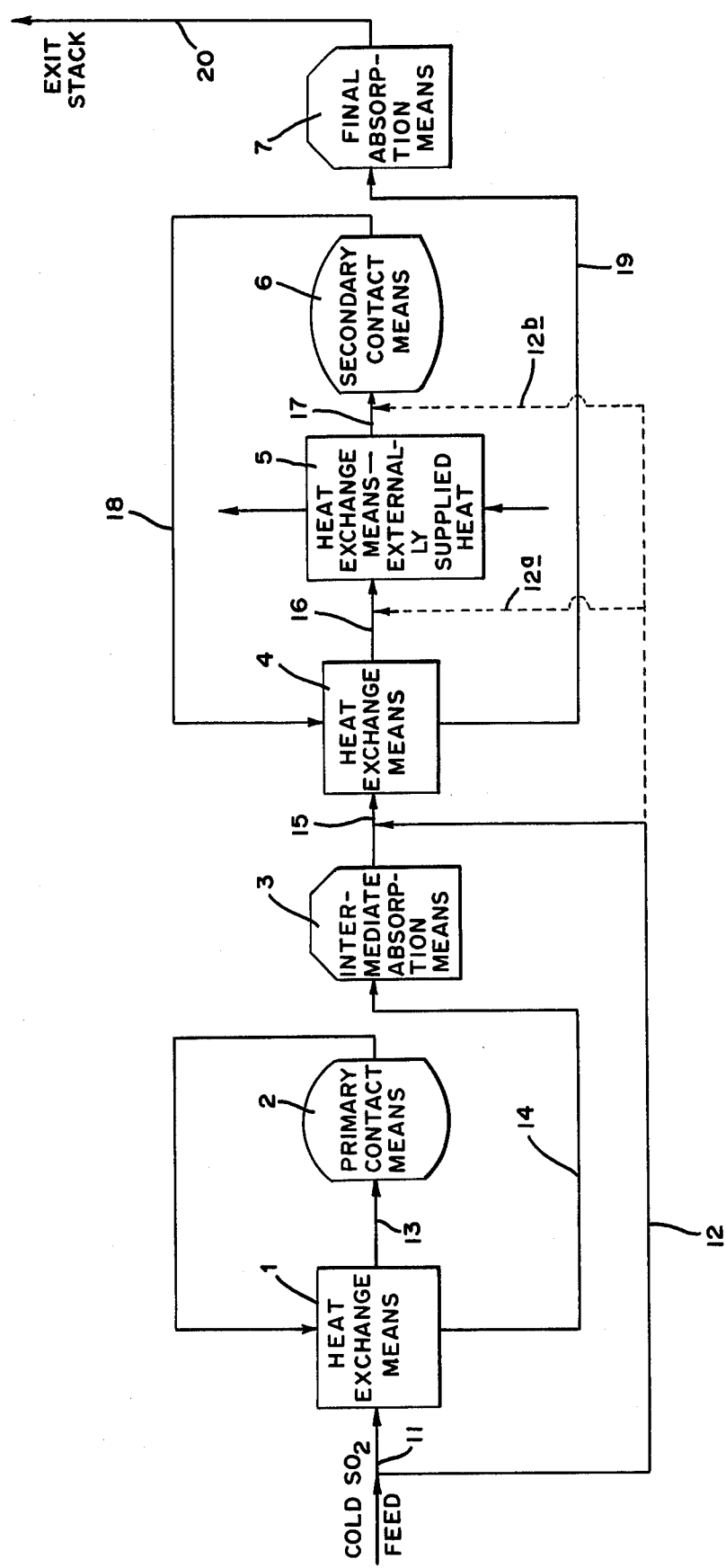
FIG. 1 is a schematic flow diagram illustrating the essential process steps and apparatus employed therefor.

DETAILED DESCRIPTION OF THE INVENTION OF THE PREFERRED EMBODIMENTS AND OF THE BEST MODE PRESENTLY CONTEMPLATED FOR ITS PRACTICE

The cold sulfur dioxide-containing feed gas stream employed for making sulfuric acid in accordance with the method of the present invention is a gas stream which has been cooled and/or scrubbed for removal of impurities therefrom by contacting it with water or weak sulfuric acid, say sulfuric acid containing less than about 50 percent by weight of $H_2SO_4$, followed by drying it, as by contacting it with sulfuric acid of higher concentration, say in about the order of 60° Be. or above. Usually, it is obtained by roasting of sulfide ores, such as pyrites, copper sulfide, zinc sulfide and others, or by thermal decomposition impurities-containing sulfuric acid, such as spent sulfuric acid from a pickling operation, sludge acid from oil refining operation, or spent acid from sulfonation or nitration operations.

Sulfur dioxide-containing gases obtained from these sources, that is to say, from metal sulfide roasting and sludge acid decomposition operations, are too highly contaminated with impurities to permit their direct introduction into a contact plant. For that reason, such gases are usually subjected to a series of purification steps, which may comprise dust removal, cooling and scrubbing and mist removal, in each instance followed by drying.

Dust removal is required since dust contained in the feed gas would rapidly plug packed towers and cartalyst beds. Dust removal may be effected by passing the feed gas stream through large baffled chambers, electrostatic precipitators, tangential dust collectors and the like. Usually, in the dust removal section the temperature of the gas stream is maintained in the range of about 650° to 1000° F to minimize condensation and sulfation of equipment. Dust removal may be omitted in gas purification operations involving sulfur dioxide-containing gas streams obtained by thermal decomposition of sludge acid.

Following removal of gross dust contamination, as above-described, it is usual practice to contact the gas stream with water or weak sulfuric acid to cool it and to remove the remaining dust. This is usually achieved through use of sprays or in packed towers. The weak acid is circulated through and cooled by use of shell-and tube-type heat exchangers of acid resisting material, such as carbon. The gases from the scrubbing step contain considerable amounts of water vapor and sulfuric acid mist. The sulfuric acid mist is usually removed by filtration, such as in coke boxes or by electrostatic precipitation.

As the final step in the wet purification operation, the moisture laden gases are dried to reduce the water content to between about 0.005 and 0.02 grams of water per standard cubic foot, desirably not higher than about 0.015 grams of water per standard cubic foot, preferably less than about 0.01 grams of water per standard cubic foot. Excessive amounts of water in the cold feed gas stream will cause corrosion of equipment and formation of sulfuric acid mist that will result in a visible absorber exit. Drying is usually accomplished by passing the gas stream through packed towers irrigated by drying acid containing from about 80 to about 99 percent by weight of sulfuric acid. The water content of the gases will be related to the strength of the sulfuric acid employed for drying, stronger acids resulting in lower water content. The temperature of the gas stream from the wet gas purification plant usually is at about ambient temperature, say in the order of about 60° to about 100° F.

The purified cold sulfur dioxide-containing feed gas stream will generally contain of from about 8 to about 12 percent by volume of sulfur dioxide, and generally of from about 7 to about 11 percent by volume oxygen, the balance comprising inert gases, such as nitrogen and carbon dioxide.

The principle of operation of the process of the present invention is explained in further detail with reference to FIG. 1. Cold sulfur dioxide-containing feed gas, that is to say, sulfur dioxide-containing feed gas which is below kindling temperature of the catalyst mass is supplied by means of a blower (not shown) through cold gas feedline 11. That feed gas stream is divided into a first stream and a second stream. The first stream is passed through heat exchange means 1, wherein it is heated to kindling temperature of the catalyst mass (in the order of about 780° to about 800° F) by indirect heat exchange with exit gas from primary contact means 2. Preheated feed gas from heat exchange means 1 is introduced into primary contact means via line 13. Primary contact means 2 comprises one or more beds of catalyst, which may any of the known sulfur dioxide oxidation catalyst such as platinum, vanadium oxides, such as vanadium pentoxide, iron oxide or other oxidation catalysts suitable for the oxidation reaction. Such oxidation catalyst is generally deposited in form of cylindrical rods, worms or irregularly shaped granules, or in any other suitable form within a converter vessel having sufficient volume to achieve at least partial conversion of the sulfur dioxide to sulfur trioxide. Catalytic oxidation of sulfur dioxide to sulfur trioxide is exothermic. To prevent the heat of reaction from deteriorating the catalyst mass from excessive temperature rise, it is usual practice to employ a plurality of converters, say, at least two, perhaps three converters, through which the gas is passed serially, for partial conversion of its sulfur dioxide content to sulfur trioxide. Gas exiting from each converter may be passed through a suitable cooling means, such as a heat exchanger, or cooling may be effected by introduction of ambient air after each conversion step. In any event, heat of reaction generated in the oxidation reaction of the sulfur dioxide is utilized in heat exchange means 1 to preheat the cold sulfur dioxide containing feed gas to the kindling temperature of the catalyst.

In heat exchange means 1 the partially converted gas is cooled to temperature in the order of about 400° to about 550° F, preferably from about 400° to about 440°

F, and is then introduced through line 14 into intermediate absorption means 3 wherein it is contacted with concentrated sulfuric acid to selectively absorb sulfur trioxide therefrom. Intermediate absorption means 3 is provided with suitable internal means for effecting efficient gas liquid contact, such as Raschig rings or other suitable packing, bubble cap trays or sieve trays. Usually, the gas stream rises within the absorber countercurrent to the downward flow of the concentrated sulfuric acid. The concentrated sulfuric acid stream preferably enters the absorber with a concentration of about 99 percent by weight sulfuric acid, although other sulfuric acid concentrations can be used consistent with conventional practice. Sulfur trioxide is absorbed from the gas phase into the sulfuric acid stream to form sulfuric acid having concentration of, say, about 99.5 percent by weight. As is conventional, the resultant sulfuric acid phase may be withdrawn from the absorber and divided into a recycle stream and a product stream. Water or weak sulfuric acid is added to the recycle stream in order to maintain its concentration at desired level, as is conventional. Temperature of the absorber acid is usually maintained within the range of about 220° to about 235° F.

The gas stream from the intermediate absorption means may comprise in the order of about 0.5 to about 2 percent by volume of sulfur dioxide, 10 to about 11 percent by volume of oxygen, the balance principally comprising nitrogen. It is desirable to maintain the sulfur dioxide content of that gas stream below about 2 percent by volume, preferably below about 1 percent by volume, in order to minimize sulfur dioxide contamination of the sulfuric acid product from the intermediate absorption means. If desired, the exit gas from the intermediate absorption means may be passed through a mist filter (not shown) and it is then mixed with the second stream, which is the cold by-pass stream, which has been by-passed around heat exchange means 1, primary contact means 2, and intermediate absorption means 3 by means of cold gas by-pass line 12. The by-passed cold gas stream comprises from about 1 to about 30 percent by volume of the total feed gas steam, preferably from about 10 to about 15 percent by volume. Desirably, the volume of the cold sulfur dioxide by-pass stream is regulated such that the sulfur dioxide content of the gas stream being introduced into secondary contact means 6 comprises from about 2 to about 4 percent by volume of sulfur dioxide, preferably from about 2 to about 3 percent by volume of sulfur dioxide, depending on the maximum amount of sulfur dioxide permitted in the exit gas stream to be vented into the atmosphere. Lower sulfur dioxide levels in the exit gas stream will, of course, result from lower sulfur dioxide content in the feed gas stream to the secondary contact means.

The mixed gas stream in line 15, which is at a temperature within the range of from about 180° to about 200° F, must next be preheated to the kindling temperature of the catalyst mass in the secondary contact means. This is effected in a series of two heat exchange means. The mixed cold gas stream is first passed into and through heat exchange means 4, wherein is it indirectly contacted with the exit gas stream from secondary contact means 6, thereby heating it to a temperature within the range from about 550° to about 580° F, which is still below the kindling temperature of the catalyst in the secondary contact means. To bring the mixed gas stream to the kindling temperature of the catalyst, which is in the neighborhood of about 780° to about 800° F, it is next passed through line 16 into heat exchange means 5 wherein heat is applied from a source external of the sulfuric acid process. That heat may, for example, be supplied by combustion of fuel, such as oil or gas. From heat exchange 5, the mixed gas stream is passed through line 17 into the secondary contact means 6, which may comprise one or more converters packed with catalyst, as described above in connection with discussion of primary contact means 2. In secondary contact means 6 remaining sulfur dioxide is oxidized to sulfur trioxide in conventional manner, and the exit gas is cooled to temperature within the range of from about 300° to about 440° F by passing it via line 18 through heat exchange means 4, wherein it gives off part of its heat to the cold mixed gas stream, as above described. From heat exchange means 4 the mixed gas stream is passed via line 19 into final absorption means 7, wherein sulfur trioxide is scrubbed therefrom by contacting it with strong sulfuric acid in the manner above described in connection with discussion of intermediate absorption means 3, and the exit gas stream from final absorption means 7 is vented to the atmosphere via exit stack 20, after first passing it through a mist filter (not shown), if desired.

Movement of the gas stream through the apparatus is effected by suitable blower means (not shown) associated with cold gas feed line 11, as well as line 15. The blower means in line 15 is located downstream from the point where cold gas by-pass line enters line 13.

It is, of course, possible to introduce the cold by-pass sulfur dioxide stream into the secondary contact means at a point other than ahead of heat exchange means 4, as by introducing it into the gas stream entering heat exchange means 5 or entering secondary contact means 6. Thus, it may be introduced as by means of line 12a and/or 12b, both shown in broken lines, between heat exchange means 4 and heat exchange means 5, and/or between heat exchange means 5 and secondary means 6, as may be desired. That would, however, require that the gases in heat exchange 4 and/or 5 are brought to temperature sufficiently high so that the temperature of the mixed gas stream downstream from the point where the cold-by-pass stream is introduced would be sufficient to reach a kindling temperature of the catalyst mass.

The method of the present invention as explained above in connection with discussion of FIG. 1 provides significant energy savings, on two accounts. First, energy requirements to move the gas stream through heat exchange means 1, primary contact means 2, and intermediate absorption means 3 are reduced by by-passing the cold by-passing stream around these pieces of equipment. The energy saved corresponds to the difference between the energy required to pass a total feed gas stream at the rate at which is supplied through heat exchange means 1, primary contact means 2 and intermediate absorption means 3, with associated lines, as against passing only part of the total feed gas stream through these pieces of equipment and by-passing the remaining part around it. Secondly, by providing a higher gas strength in the mixed gas stream downstream from the intermediate absorption means 3, more sulfur dioxide is available in secondary contact means 6 for oxidation into sulfur trioxide, which results in generation of additional heat from the oxidation, which additional heat can be imparted to the cold mixed gas stream in heat exchange means 4, thereby reducing the amount of externally supplied heat which must be supplied in heat exchange means 5 in order to bring the gas stream to the kindling temperature of the catalyst in the secondary contact means.

It should be recognized that detail design of the individual pieces of equipment employed in the method of the invention process, and their operation, are within the capabilities of one of ordinary skill in the art.

Figure 2:
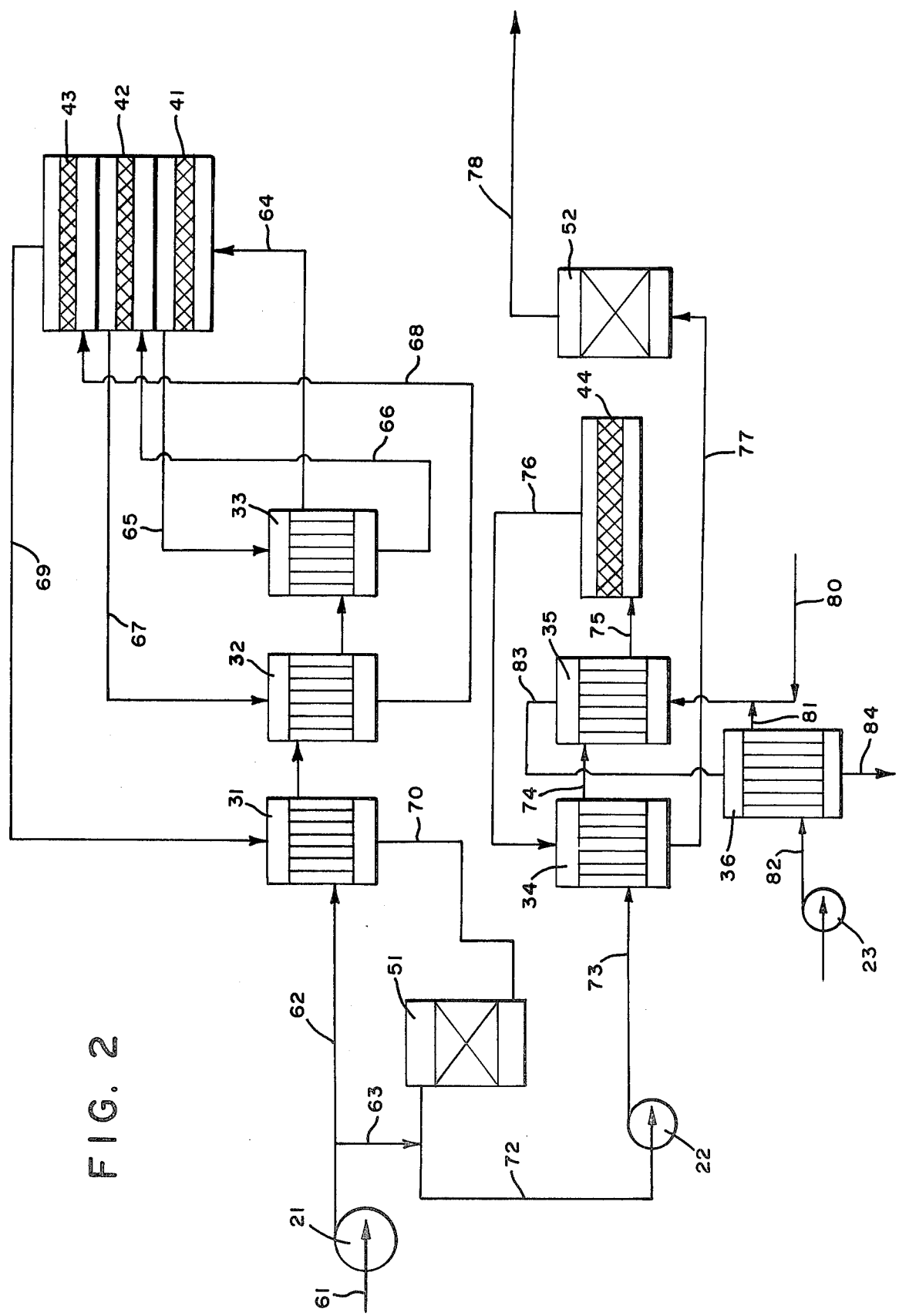
FIG. 2 is a schematic flow diagram of a contact sulfuric acid plant employing a cold sulfur dioxide-containing feed gas stream obtained from a wet gas purification plant, employing cold gas by-pass around the primary conversion and intermediate absorption sections in accordance with the present invention.

With reference to FIG. 2, a cold sulfur dioxide-containing feed gas stream obtained from a wet gas purification plant is introduced to the conversion system via feed line 61 at a rate of 60,000 SCFM. The feed gas stream contains about 11 percent by volume of sulfur dioxide, 12 percent by volume of oxygen, the balance being inert gases such as nitrogen and carbon dioxide. The feed gas stream is moved through the system by means of blower 21. Downstream from blower 21 the feed gas stream is split into two streams, a first gas stream in line 62, and a second gas stream in line 63. The second gas stream passed through line 63 comprises about 10 to about 25 percent by volume of the total feed gas stream. Assuming the second gas stream to be about 12 percent by volume of the total feed gas stream, it amounts to about 7,800 SCFM.

The first gas stream is serially passsed through heat exchangers 31, 32 and 33, which are of shell-and-tube type construction. The temperature of the first gas stream at the exits of these heat exchangers is as follows: out heat exchanger 31 about 680° F; out heat exchanger 32 about 740° F, and; out heat exchanger 33 about 800° F. From heat exchanger 33, the first gas stream, which is now preheated to the kindling temperature of the catalyst, is passed to and through first catalyst bed 41 by means of line 64. In catalyst bed 41, part of the sulfur dioxide contained in the feed gas stream is oxidized to sulfur trioxide with resultant temperature rise of the gas stream to about 1140° F. The gas stream is next passed via line 65 through heat exchanger 33 therein it is cooled to temperature in the order of about 820° to about 840° F by indirect heat exchange with incoming feed gas, as above described, and is next passed via line 66 to a second catalyst bed 42, wherein again part of the remaining sulfur dioxide is oxidized to sulfur trioxide under heating of the gas stream to temperature in the order of about 940° F. The exit gas from second catalyst bed 42 is passed via line 67 through heat exchanger 32 wherein it is cooled to temperature in the order of about 820° F, to be routed via line 68 through third catalyst bed 43, wherein again part of the remaining sulfur dioxide is oxidized to sulfur trioxide under heat rise to about 940° F. Catalyst beds 41, 42 and 43 together comprise the primary contact means. In the gas stream exiting from third catalyst bed 43, about 91.5 percent of the sulfur dioxide originally contained therein have been converted to sulfur trioxide. The exit gas stream is then passed via line 69 through heat exchanger 31, wherein it is cooled to temperature in the order of about 435° to about 440° F, to be introduced via line 70 into intermediate absorber 51 wherein it is contacted with sulfuric acid of about 99 percent by weight of $H_2SO_4$ having temperature of about 230° F, to selectively absorb sulfur trioxide therefrom.

The first gas stream leaves absorber 51 at a temperature of about 225° to about 230° F and contains about 1.1 percent by volume of sulfur dioxide. That first gas stream is next mixed with the second (by-pass) gas stream, to obtain a mixed gas stream containing about 2.7 percent by volume of sulfur dioxide. The mixed gas stream has a temperature of about 180° to about 190° F. The mixed gas stream is passed through heat exchangers 34 and 35 by means of blower 22 via lines 73 and 74. In heat exchangers 34 and 35 the mixed gas stream is respectively heated to temperature within the range of from about 190° to about 590° F and from about 590° to about 790° F. Both heat exchangers 34 and 35, are of shell-and-tube type construction. In heat exchanger 34 the mixed gas stream is brought into indirect heat exchange contact with the exit gas from secondary catalyst bed 44, in heat exchanger 35 it is brought into indirect heat exchange contact with products of combustion of fossil fuel, say natural gas or oil.

After passage through heat exchangers 34 and 35, the mixed gas stream, now preheated to the kindling temperature of the catalyst, is passed through secondary catalyst bed 44 wherein reamining sulfur dioxide is oxidized to sulfur trioxide, under heating of the gas stream to temperature within the range of from about 825° to about 860° F. That gas stream next is passed via line 76 through heat exchanger 34 wherein its temperature is reduced to within about 440° to about 450° F, and is then introduced into final absorber 52 via line 77. In final absorber 52, the gas stream is contacted with sulfuric acid containing about 99 percent $H_2SO_4$ by weight, in the manner above described in connection with absorption in intermediate absorber 51, to scrub remaining sulfur trioxide from the gas stream. The exit gas stream from absorber 52 is vented to the atmosphere via line 78 after passage through an optional mist filter (not shown). The exit gas stream vented to the atmosphere contains about 830 ppm of sulfur dioxide.

Reverting momentarily to the step of heating the mixed gas stream in heat exchanger 35 by indirect heat exchange with products of combustion, a fuel, such as gas or oil, is supplied through line 80, and is burned in preheated air supplied via line 81. The resultant products of combustion are passed through heat exchanger 35, wherein they preheat the mixed gas stream to the kindling temperature of the catalyst. Combustion air is introduced by means of blower 23 via line 82, and is passed for preheating through heat exchanger 35, wherein it is brought into indirect heat exchange contact with gas from heat exchanger 35, which represents the partially cooled products of combustion of the fuel. Products of combustion so cooled in heat exchanger 36 are exhausted to the atmosphere via line 84.

The Table below summarizes beneficial results obtained by the improvement of the present invention when applied to a contact sulfuric acid plant employing double conversion-double absorption, as above-described, operating on a cold sulfur dioxide-containing feed gas stream obtained from a wet gas purification plant, containing about 11 percent by volume of sulfur dioxide, 12 percent by volume of oxygen, the balance being inert gases, supplied at a rate of about 65,000 SCFM.

TABLE

|  | Without Split Feed, Conventional Process | Invention Process | Saved Units | % |
|---|---|---|---|---|
| First Catalyst Bed, Liters Catalyst | 47,000 | 39,100 | | |
| Second Catalyst Bed, Liters Catalyst | 52,500 | 40,300 | | |
| Third Catalyst Bed, Liters Catalyst | 71,300 | 52,300 | | |
| Pressure Drop, Primary Conversion and Intermediate Absorption Sections, Inches H$_2$O | 87 | 50 | | |
| Pressue Drop, Secondary Conversion and Final Absorption Sections, Inches H$_2$O | 55 | 44 | | |
| Oil Consumption, Barrels/Year | 32,800 | 28,00 | 4,800 | 14.6 |
| Electricity Consumed, KWH/Year | 17,370,000 | 12,500,000 | 4,870,000 | 28.0 |

The improvement of the present invention, as described above in connection with FIG. 1, permits substantial reduction in the size of equipment for the primary contact and intermediate absorption sections, and it results in substantial reduction in fuel consumption and electric power consumption. Correspondingly smaller or larger reductions may be obtained by decreasing or increasing the proportion of the sulfur dioxide-containing feed gas stream which is by-passed around the primary contact and intermediate absorption sections. This, however is accompanied by the penalty of somewhat higher sulfur dioxide content of the exit gas stream, and the degree of by-pass, upon which the sulfur dioxide content of the exit gas stream to a substantial degree depends, will have to be consistent with such regulations as may govern permissible SO$_2$ content of the exit gas stream.

The improvement of the present invention also provides a facile method for controlling the sulfur dioxide content of the exit gas stream. In this connection, reference is made to FIG. 3. The equipment and gas flow shown in FIG. 3 are identical to that shown in FIG. 1, except that certain control means, to be discussed in detail below, are shown superimposed in heavy lines. Thus, there is provided in exit stack 20, a sensor 101 which continually monitors the SO$_2$ content of the exit gases. Such sensors are known and available. Sensor 101 is operatively connected to control valve 102. Control valve 102 regulates the amount of sulfur dioxide-containing feed gas which is passed through cold gas by-pass line 12 responsive to signals received from sensor 101. Sensor 101 and control valve 102 are programed employing conventional process control equipment to maintain sulfur dioxide content of the gases in exit stack 20 at a predetermined level. Should the sulfur dioxide content in the exit gases rise above that level, sensor 101 will send a signal to control valve 102 responsive to which control valve 102 will function to reduce the amount of cold sulfur dioxide feed gas which is passed around the primary contact and intermediate absorption sections via line 12, thereby reducing the sulfur dioxide content which enters the secondary contact means and, consequently, reducing the sulfur dioxide content in the exit gases. Conversely, should sensor 101 detect a reduction in the sulfur dioxide content of the exit gases, a signal will be given to control valve 102 to increase the amount of cold gas that is by-passed, thereby increasing the sulfur dioxide content of the gases entering the secondary contact means and consequently bringing the sulfur dioxide content in the exit gases to the predetermined level.

It should be recognized that any change in the amount of cold feed gas that it by-passed around the primary contact and intermediate absorption sections will alter the amount of heat generated within the secondary contact means, for reasons above explained. Therefore it would be desirable to employ means for automatically controlling the temperature entering the secondary contact means by varying the amount of externally applied heat to heat exchange means 5. This may be accomplished by provision of temperature sensor 103 in line 17, which is operatively connected to a fuel control valve 104 which increases or decreases the fuel flow responsive to decrease or increase in temperature of the gases passing through line 17 as sensed by sensor 103. Conjoint employment of the sulfur dioxide control means in the exit gas by the joint operation of sensor 101 and control valve 102, in conjunction with heat control by means of heat sensor 103 and fuel control valve 104, will serve to maximize the benefits to be gained by the improvement of the present invention.

Since various changes may be made in carrying out the improved process of my invention without departing from its scope and essential characteristics, all matter contained in the above descriptions shall be interpreted as illustrative only, the scope of my invention being defined by the appended claims.

I claim:

1. The process for making sulfuric acid by catalytic oxidation of sulfur dioxide from a cold sulfur dioxide-containing gas stream from a wet gas purification plant involving the steps of:
   (a) dividing said cold gas stream into a first and a second stream, said second stream comprising from about 1 to about 30 percent by volume of the total gas stream;
   (b) preheating the first gas stream to the kindling temperature of the catalyst;
   (c) passing the preheated first gas stream through a primary contact section containing catalyst to effect oxidation of part of the sulfur dioxide to sulfur trioxide;
   (d) cooling the gas stream from the primary contact section to temperature between about 400° and about 550° F;
   (e) contacting the gas stream so cooled with sulfuric acid in an intermediate absorption section to effect absorption of sulfur trioxide therefrom;

(f) combining the gas stream from the intermediate absorption section with said second gas stream obtained in step a), above, and preheating the combined gas stream to the kindling temperature of the catalyst by indirect heat exchange with hot gases from step g), below, augmented by indirect heat exchange with an external heat source, if necessary;

(g) passing the preheated combined gas stream through a secondary contact section containing catalyst to effect oxidation of sulfur dioxide contained therein to sulfur trioxide;

(h) cooling the gas stream from the secondary contact section to temperature between about 300° and about 450° F by indirect heat exchange with the gas stream to be introduced into the secondary contact section; followed by (i) contacting the cooled gas stream with sulfuric acid to effect absorption of sulfur trioxide therefrom.

2. The process of claim 1 wherein the gas stream obtained from the intermediate absorption section in step e) contains from about 0.5 to about 2 percent by volume of sulfur dioxide.

3. The process of claim 1 wherein the gas stream obtained from the intermediate absorption section in step e) contains less than about 1 percent by volume of sulfur dioxide.

4. The process of claim 2 wherein further the combined gas stream obtained in step f) contains from about 2 to about 4 percent by volume of sulfur dioxide.

5. The process of claim 3 wherein further the combined gas stream obtained in step f) contains from about 2 to about 4 percent by volume of sulfur dioxide.

6. The process of claim 1 wherein said second gas stream comprises from about 10 to about 15 percent by volume of the total gas stream, wherein the gas stream obtained from the intermediate absorption section in step e) contains from about 0.5 to about 2 percent by volume of sulfur dioxide, and wherein further the combined gas stream obtained in step f) contains from about 2 to about 4 percent by volume of sulfur dioxide.

7. The process of claim 1 wherein said second gas stream comprises from about 10 to about 15 percent by volume of the total gas stream, wherein the gas stream obtained from the intermediate absorption section in step e) contains less than about 1 percent by volume of sulfur dioxide, and wherein the combined gas stream obtained in step f) contains from about 2 to about 4 percent by volume of sulfur dioxide.

8. The process of claim 1 with the further steps of sensing the sulfur dioxide content in the gas stream obtained in step i) from contacting the cooled gas stream with sulfuric acid to effect absorption of sulfur trioxide therefrom, and regulating the volume of said second stream obtained in step a) to maintain the sulfur dioxide content in the gas stream obtained in step i) at predetermined level.

* * * * *